(12) United States Patent
Czyz et al.

(10) Patent No.: US 9,738,253 B2
(45) Date of Patent: Aug. 22, 2017

(54) SENSOR SYSTEM FOR MOTOR VEHICLE

(75) Inventors: Thomas Czyz, Baldwinsville, NY (US); Andrew Buyck, Baldwinsville, NY (US); Joseph Impellizzieri, Fairport, NY (US)

(73) Assignee: APS SYSTEMS, LLC., Baldwinsville, NY (US)

( * ) Notice: Subject to any disclaimer, the term of this patent is extended or adjusted under 35 U.S.C. 154(b) by 671 days.

(21) Appl. No.: 13/472,083

(22) Filed: May 15, 2012

(65) Prior Publication Data

US 2013/0311035 A1 Nov. 21, 2013

(51) Int. Cl.
| | |
|---|---|
| *G06F 7/00* | (2006.01) |
| *B60R 25/10* | (2013.01) |
| *G01S 13/87* | (2006.01) |
| *G01S 13/93* | (2006.01) |
| *B60Q 1/00* | (2006.01) |
| *B60Q 1/24* | (2006.01) |
| *B60Q 1/26* | (2006.01) |

(52) U.S. Cl.
CPC ........ *B60R 25/1004* (2013.01); *B60Q 1/0023* (2013.01); *B60Q 1/245* (2013.01); *B60Q 1/2611* (2013.01); *G01S 13/87* (2013.01); *G01S 13/931* (2013.01); *G01S 2013/9332* (2013.01); *G01S 2013/9382* (2013.01)

(58) Field of Classification Search
CPC ........ G08G 1/161; G08G 1/16; G01S 17/023; B60R 16/0315; B60K 37/06; G06K 7/10732; G06K 7/10881; H03H 7/40
USPC .................. 701/36, 119; 340/435
See application file for complete search history.

(56) References Cited

U.S. PATENT DOCUMENTS

| | | | |
|---|---|---|---|
| 2,427,436 A | 6/1945 | Beems et al. | |
| 5,034,860 A | 7/1991 | Bryant et al. | |
| 5,319,350 A * | 6/1994 | DeMarco | B60R 25/1004 340/426.22 |
| 5,572,204 A | 11/1996 | Timm et al. | |
| 5,686,910 A | 11/1997 | Timm et al. | |
| 5,687,215 A | 11/1997 | Timm et al. | |
| 5,729,016 A | 3/1998 | Klapper et al. | |
| 5,781,101 A | 7/1998 | Stephen et al. | |
| 5,890,061 A | 3/1999 | Timm et al. | |
| 6,067,007 A | 5/2000 | Gioia | |
| 6,081,191 A | 6/2000 | Green et al. | |
| 6,161,066 A * | 12/2000 | Wright | B60Q 1/2611 340/468 |

(Continued)

FOREIGN PATENT DOCUMENTS

| | | |
|---|---|---|
| EP | 1 775 692 A2 | 4/2007 |
| JP | 2000-30197 A | 1/2000 |

(Continued)

*Primary Examiner* — Shardul Patel
(74) *Attorney, Agent, or Firm* — George S. Blasiak; Heslin, Rothenberg, Farley & Mesiti, PC

(57) ABSTRACT

There is set forth herein in one embodiment a system for detecting physical objects within a perimeter. The system can include one or more sensors configured to be supported by a motor vehicle. The system can include a processing system and the processing system can be configured to detect a physical object moving within the perimeter based on an output of the one or more sensors. The processing system can be configured to transmit a notification responsive to detecting a person approaching the motor vehicle.

32 Claims, 9 Drawing Sheets

(56) References Cited

U.S. PATENT DOCUMENTS

| | | | |
|---|---|---|---|
| 6,373,380 B1 | 4/2002 | Robertson et al. | |
| 6,438,491 B1* | 8/2002 | Farmer | B60W 30/16 |
| | | | 340/435 |
| 6,619,212 B1 | 9/2003 | Stephan et al. | |
| 6,637,343 B2 | 10/2003 | Stephan et al. | |
| 6,651,566 B2 | 11/2003 | Stephan et al. | |
| 6,795,237 B1 | 9/2004 | Marinelli et al. | |
| 6,832,137 B2 | 12/2004 | Rao et al. | |
| 6,906,620 B2 | 6/2005 | Nakai et al. | |
| 6,956,469 B2* | 10/2005 | Hirvonen | G06K 9/00201 |
| | | | 340/425.5 |
| 6,958,683 B2 | 10/2005 | Mills et al. | |
| 6,969,855 B2 | 11/2005 | Remillard et al. | |
| 7,024,292 B2 | 4/2006 | Remillard et al. | |
| 7,129,852 B2 | 10/2006 | Aslund et al. | |
| 7,380,633 B2 | 6/2008 | Shen et al. | |
| 7,411,175 B2 | 8/2008 | Schwartz | |
| 7,526,369 B2 | 4/2009 | Sugiura et al. | |
| 2002/0175830 A1* | 11/2002 | Hudson | E01F 9/662 |
| | | | 340/907 |
| 2002/0184236 A1 | 12/2002 | Donath | B60R 1/00 |
| 2003/0007074 A1* | 1/2003 | Nagaoka | G06K 9/00805 |
| | | | 348/148 |
| 2003/0016128 A1* | 1/2003 | Lutz | G08C 19/00 |
| | | | 340/517 |
| 2003/0173172 A1 | 9/2003 | Stephan et al. | |
| 2003/0173173 A1 | 9/2003 | Stephan et al. | |
| 2003/0173174 A1 | 9/2003 | Stephan et al. | |
| 2003/0210129 A1 | 11/2003 | Aslund et al. | |
| 2003/0228826 A1* | 12/2003 | Dougherty | A63H 17/00 |
| | | | 446/175 |
| 2004/0016870 A1* | 1/2004 | Pawlicki | H04N 5/247 |
| | | | 250/208.1 |
| 2004/0107033 A1 | 6/2004 | Rao et al. | |
| 2004/0117086 A1 | 6/2004 | Rao et al. | |
| 2004/0258279 A1 | 12/2004 | Hirvonen et al. | |
| 2005/0017857 A1 | 1/2005 | Rao et al. | |
| 2005/0065683 A1 | 3/2005 | Remillard et al. | |
| 2005/0073437 A1 | 4/2005 | Perri | |
| 2005/0111698 A1 | 5/2005 | Kawai | |
| 2005/0154503 A1* | 7/2005 | Jacobs | G05D 1/0242 |
| | | | 701/1 |
| 2005/0230623 A1 | 10/2005 | Remillard et al. | |
| 2006/0080011 A1 | 4/2006 | Gaboury et al. | |
| 2006/0082110 A1 | 4/2006 | Gaboury et al. | |
| 2006/0085131 A1 | 4/2006 | Yopp et al. | |
| 2006/0146552 A1 | 7/2006 | Shaffer et al. | |
| 2006/0213674 A1 | 9/2006 | Dierker, Jr. et al. | |
| 2006/0250230 A1* | 11/2006 | Fischer | B60R 25/1004 |
| | | | 340/500 |
| 2006/0271258 A1 | 11/2006 | Salmeen et al. | |
| 2007/0088488 A1* | 4/2007 | Reeves | G07C 5/085 |
| | | | 701/117 |
| 2007/0162231 A1* | 7/2007 | Schlogl | B60R 21/0136 |
| | | | 701/301 |
| 2007/0182526 A1* | 8/2007 | Horii | B60R 25/1004 |
| | | | 340/426.1 |
| 2007/0217780 A1* | 9/2007 | Hirooka | G06T 7/0065 |
| | | | 396/287 |
| 2007/0222565 A1* | 9/2007 | Kawamata | B60R 21/0134 |
| | | | 340/435 |
| 2008/0084286 A1* | 4/2008 | Teramura | B60Q 1/085 |
| | | | 340/438 |
| 2008/0319670 A1 | 12/2008 | Yopp et al. | |
| 2009/0002145 A1 | 1/2009 | Berry et al. | |
| 2009/0062005 A1* | 3/2009 | Lu | A63F 13/10 |
| | | | 463/37 |
| 2009/0152833 A1* | 6/2009 | Johnson | B60Q 1/2611 |
| | | | 280/504 |
| 2009/0313072 A1 | 12/2009 | Balok et al. | |
| 2010/0227582 A1 | 9/2010 | Berry et al. | |
| 2010/0328644 A1* | 12/2010 | Lu | G01S 7/4802 |
| | | | 356/5.01 |
| 2011/0098016 A1 | 4/2011 | Hatton et al. | |
| 2011/0202247 A1* | 8/2011 | Takeoka | G05D 1/024 |
| | | | 701/70 |
| 2011/0220469 A1 | 9/2011 | Freiburger et al. | |
| 2011/0224864 A1* | 9/2011 | Gellatly | G01C 21/3679 |
| | | | 701/29.5 |
| 2011/0288812 A1* | 11/2011 | Thierman | G01B 11/002 |
| | | | 702/141 |
| 2012/0166080 A1* | 6/2012 | Hung | G08G 1/0175 |
| | | | 701/448 |
| 2012/0185160 A1* | 7/2012 | Kumabe | G08G 1/164 |
| | | | 701/301 |
| 2012/0316734 A1* | 12/2012 | Takagi | B60Q 5/008 |
| | | | 701/45 |
| 2012/0320211 A1* | 12/2012 | Mitsugi | G06T 3/00 |
| | | | 348/148 |
| 2013/0066542 A1* | 3/2013 | Chung | G08G 1/04 |
| | | | 701/119 |
| 2013/0151135 A1* | 6/2013 | Aubrey | G08G 1/00 |
| | | | 701/118 |
| 2013/0218448 A1* | 8/2013 | Suzuki | G01S 13/931 |
| | | | 701/300 |
| 2013/0234618 A1* | 9/2013 | Stopa | H05B 37/02 |
| | | | 315/297 |
| 2013/0297387 A1* | 11/2013 | Michael | G08G 1/0112 |
| | | | 705/13 |
| 2014/0055252 A1 | 2/2014 | Ascencio | |
| 2014/0092249 A1 | 4/2014 | Freiburger | |
| 2014/0111647 A1* | 4/2014 | Atsmon | H04N 7/185 |
| | | | 348/148 |
| 2014/0195138 A1* | 7/2014 | Stelzig | G08G 1/0116 |
| | | | 701/119 |
| 2014/0309841 A1* | 10/2014 | Hara | G05D 1/024 |
| | | | 701/26 |

FOREIGN PATENT DOCUMENTS

| | | |
|---|---|---|
| JP | 2003-9140 A | 1/2003 |
| JP | 2007-259076 A | 10/2007 |
| JP | 2008-234029 A | 10/2008 |
| WO | 95/01890 A1 | 1/1995 |

* cited by examiner

SENSOR SYSTEM FOR MOTOR VEHICLE

FIELD OF THE INVENTION

The invention is generally related to motor vehicle sensor systems and is specifically related to a sensor system intended to detect physical objects within a configurable perimeter.

BACKGROUND OF THE INVENTION

Movement detecting sensors including infrared sensors and microwave radar sensors are widely used to detect moving objects. Infrared sensors are capable of detecting heat radiated by a moving object (e.g., by a human body). Microwave radars send out electromagnetic waves and measure the reflection in order to detect the location and direction of a moving object. Movement detecting sensors are capable of detecting a moving object at distances ranging from several feet to several hundred feet.

SUMMARY OF THE INVENTION

There is set forth herein in one embodiment a system for detecting physical objects within a perimeter. The system can include one or more sensors configured to be supported by a motor vehicle. The system can include a processing system and the processing system can be configured to detect a physical object moving within the perimeter based on an output of the one or more sensors. The processing system can be configured to transmit a notification responsive to detecting a person approaching the motor vehicle.

In one embodiment, there is provided a light bar assembly comprising an elongated housing mountable to a roof of a motor vehicle and comprising a plurality of light transmissive sections. The light bar assembly can further comprise two or more light sources disposed within the elongated housing and one or more sensors disposed in an interleaved configuration with the light sources. The light bar assembly can further comprise a controller communicatively coupled to the light bar via a wired interface including data wires and electric power wires. The data wires can be communicatively coupled to the sensors. Each sensor can be configured to output an electrical signal responsive to detecting a physical object within a spatial sector. A projection on a surface sustaining the motor vehicle of each spatial sector can be provided by a circle sector. The combination of all circle sectors can compose a sensing perimeter. In one embodiment, the sensing perimeter can be provided by a full circle with a center disposed within a projection of the motor vehicle onto the surface. Alternatively, the sensing perimeter can have an arbitrary shape configurable via a user interface.

In some embodiments, a first light source can be disposed behind the first light transmissive section of the plurality of light transmissive sections and a second light source can be disposed behind the second light transmissive section of the plurality of light transmissive sections.

In some embodiments, at least one sensor can be provided by a microwave radar sensor.

In some embodiments, the sensors can be provided by four sensors oriented towards front, rear, left, and right directions relative to the direction of travel of the motor vehicle.

In some embodiments, the light bar assembly can further comprise a second wired interface including electric power wires and data wires. The electric power wires of the second wired interface can be configured to electrically couple the controller to an electric power supply. The data wires of the second wired interface can be configured to communicatively couple the controller to a processing unit.

In some embodiments, each section of the housing can be mechanically coupled to at least two neighboring sections.

In some embodiments, each light transmissive section can be configured to transmit light in a pre-determined spectrum region.

In some embodiments, the light bar assembly can further comprise a plurality of light reflectors installed behind the light sources within the housing and configured to reflect light emitted by the light sources.

In some embodiments, each sensor can be disposed in a sensor housing comprising a multi-pin electromechanical connector.

In some embodiments, the light transmissive sections can be disposed substantially perpendicularly to the surface sustaining the motor vehicle.

In some embodiments, the light bar housing can further comprise two horizontal sections disposed substantially parallel to the surface sustaining the motor vehicle. The light transmissive sections can be mechanically coupled to the horizontal sections.

In another embodiment, there is provided a system for detecting physical objects within a configurable perimeter. The system can comprise a light bar mountable on a roof of a motor vehicle, including two or more light sources and one or more sensors disposed within the light bar housing. Each sensor can be configured to detect physical objects within a spatial sector. The system can further comprise a controller communicatively coupled to the light bar via a first wired interface comprising a plurality of data wires and a plurality of power wires. The system can further comprise an electric power supply electrically coupled to the controller via at least one wire. The system can further comprise a processing unit communicatively coupled to the controller via a second wired interface comprising a plurality of data wires. The system can further comprise a software module executable by the processing unit. The software module can be configured to detect a physical object moving within the configurable perimeter. The system can further comprise a notification device communicatively coupled to the processing unit. At least one data wire of the first wired interface can be configured to carry one or more sensor data items received from at least one sensor of the one or more sensors. At least one data wire of the second wired interface can be configured to carry data received from the controller, the data comprising one or more sensor data items and/or one or more data items derived from the one or more sensor data items. The software module can be configured, responsive to detecting, based on the data received from the controller, a person approaching the motor vehicle, to transmit a notification via the notification device.

Each sensor can be configured to output an electrical signal responsive to detecting a physical object within a spatial sector. A projection on a surface sustaining the motor vehicle of each spatial sector can be provided by a circle sector. The combination of all circle sectors can compose a sensing perimeter. In one embodiment, the sensing perimeter can be provided by a full circle with a center disposed within a projection of the motor vehicle onto the surface. Alternatively, the sensing perimeter can have an arbitrary shape configurable via a user interface.

In some embodiments, at least one sensor of the one or more sensors can be provided by a microwave radar sensor.

In some embodiments, the light sources and the sensors can be mounted within the housing in an interleaving order.

In some embodiments, the one or more sensors can comprise four sensors oriented towards front, rear, left, and right directions relative to the direction of travel of the motor vehicle.

In some embodiments, the processing unit can be provided by a personal computer installed on the motor vehicle.

In some embodiments, the notification device can be provided by a screen of a personal computer installed on the motor vehicle.

In some embodiments, the notification device can be provided by a sound output device of a personal computer installed on the motor vehicle. Alternatively, the notification device can be integrated into the existing radio-speakers of the motor vehicle.

In some embodiments, the notification device can be provided by a search light configured to be switched on and oriented generally in a direction of a person approaching the motor vehicle.

In some embodiments, the electric power supply can be provided by a main battery of the motor vehicle.

In some embodiments, the electric power supply can be independent from an electric power supply of the motor vehicle.

In some embodiments, the system can further comprise a user interface configured to modify at least one parameter of the system.

In some embodiments, the processing unit can be configured to activate the notification device based on any combination of the distance to the moving object, the speed of the moving object, the direction of the moving object, and the size of the moving object detected by at least one sensor of the one or more sensors.

In some embodiments, the system can be further configured to store in a non-volatile memory a first data item received from a sensor and/or a second data item derived from the first data item.

In some embodiments, the system can be further configured to transmit to an external computer a first data item received from a sensor and/or a second data item derived from the first data item.

In a yet another embodiment, there is provided a system for detecting physical objects within a configurable perimeter. The system can comprise a light bar mountable on a roof of a motor vehicle, including two or more light sources and one or more sensors disposed within the light bar housing. The system can further comprise a processing unit communicatively coupled to the sensors. The system can further comprise a software module executable by the processing unit. The software module can be configured to detect a physical object moving within the configurable perimeter. The system can further comprise a notification device communicatively coupled to the processing unit. The software module can be configured, responsive to receiving from at least one sensor of the one or more sensors one or more sensor data items comprising coordinates of a physical object, to convert the coordinates into a universal coordinate system common for one or more sensors of the one or more sensors. The software module can be further configured, responsive to detecting, based on the one or more sensor data items, a person approaching the motor vehicle, to transmit a notification via the notification device.

Each sensor can be configured to output an electrical signal responsive to detecting a physical object within a spatial sector. A projection on a surface sustaining the motor vehicle of each spatial sector can be provided by a circle sector. The combination of all circle sectors can compose a sensing perimeter. In one embodiment, the sensing perimeter can be provided by a full circle with a center disposed within a projection of the motor vehicle onto the surface. Alternatively, the sensing perimeter can have an arbitrary shape configurable via a user interface.

In some embodiments, at least one sensor of the one or more sensors can be provided by a microwave radar sensor.

In some embodiments, the origin of the universal coordinate system can be disposed within the geometric center of projections of positions of one or more sensors of the one or more sensors.

In some embodiments, the software module can be further configured to exclude duplicate event detection caused by overlaying of fields of view of one or more sensors of the one or more sensors.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
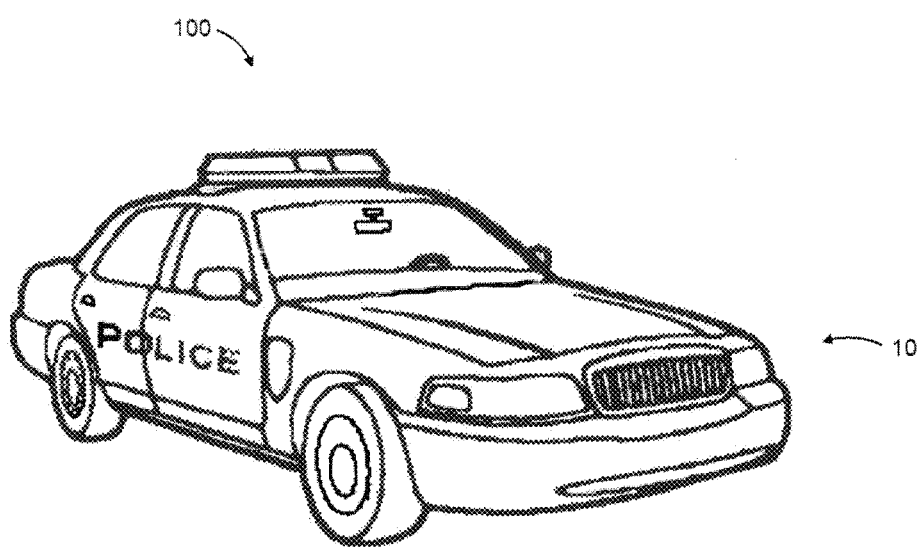
FIG. 1 schematically illustrates a motor vehicle equipped with a sensor system disclosed herein.

In one embodiment, there is provided a system for detecting physical objects within a configurable perimeter. The system can comprise a light bar 100 mountable on the roof of a motor vehicle 10, as schematically shown in FIG. 1. Disposed within the housing of the light bar can be one or more sensors, each sensor being configured to detect physical objects within a pre-determined, dynamically adjustable, or user-configurable spatial sector. The system can further comprise a controller communicatively coupled to the light bar, a processing unit (provided, e.g., by an onboard computer) communicatively coupled to the controller, and a software module executable by the processing unit. The software module can be configured to process the data returned by the sensors and to provide an audible and/or visual notification responsive to detecting a person approaching the motor vehicle.

Disposing the sensors within the light bar housing can be advantageous in several aspects. In one aspect, location of the light bar on the roof of the motor vehicle provides the best possible position for motion detecting sensors to achieve a field of view which is not obstructed by other components of the motor vehicle. In another aspect, the light bar has pre-existing wiring and cable channels connecting the components of the light bar to the motor vehicle's power supply and other circuitry located within the body of the motor vehicle. In one embodiment, at least one of the sensors can be integrated with the pre-existing wiring of the light bar. In a further aspect, the light bar housing can protect the sensors from environmental factors which can potentially adversely affect the sensors' performance (e.g., dust, water, etc.).

Figure 2:
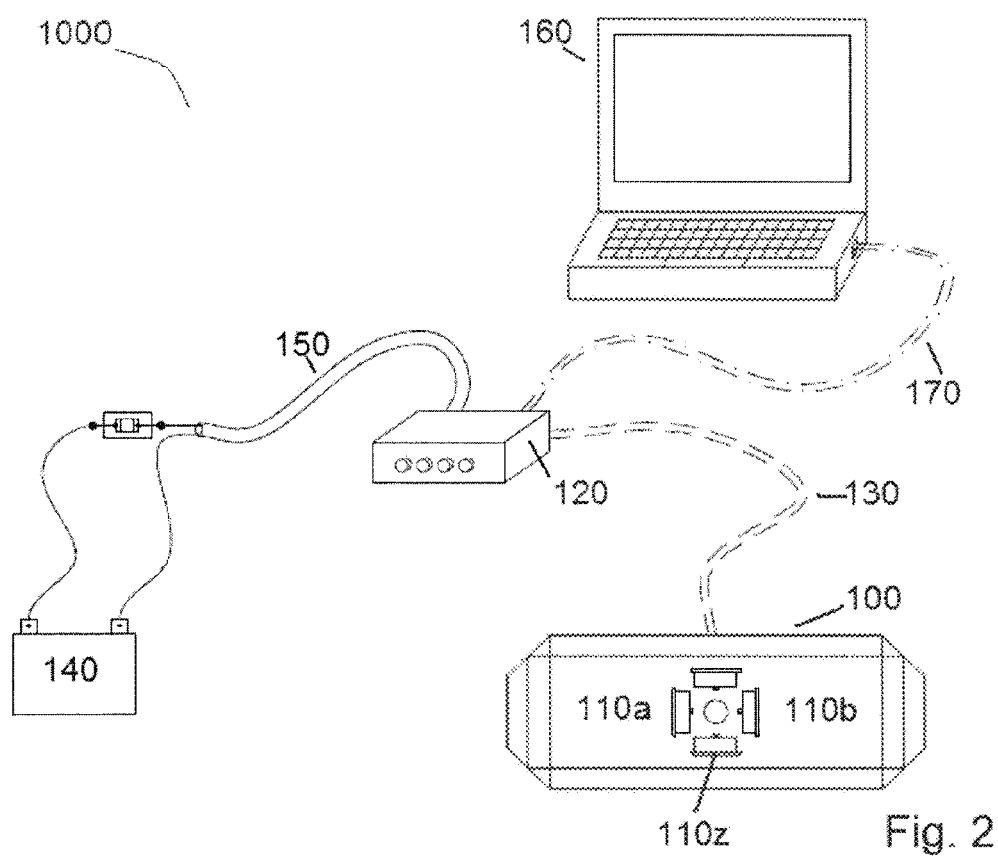
FIG. 2 schematically illustrates a component diagram of one embodiment of the sensor system disclosed herein.

A component diagram of one embodiment of the system disclosed herein is shown in FIG. 2. As mentioned herein supra, the system 1000 can comprise a light bar 100 mountable on the roof of a motor vehicle (not shown in FIG. 2). One or more sensors 110a-110z can be disposed within the housing of light bar 10 as described in details herein infra. Light bar 100 can be communicatively coupled to a light bar controller 120, e.g., via a wired interface 130 comprising a plurality of wires, including, for example, data wires, and/or power wires. At least one of the data wires of wired interface 130 can be configured to carry sensor data comprising a plurality of data items received from one or more sensors 110a-110z. In an alternative embodiment, at least some of the sensors 110a-110z can be communicatively coupled to the light bar controller 120 over a wireless communication interface.

Light bar controller 120 can comprise a microprocessor (provided, e.g., by a general purpose microprocessor or a specialized microprocessor), memory, a plurality of communication interfaces, and auxiliary circuitry needed for the functioning of the above listed components. Light bar controller 120 can be configured to control the functioning of light bar 100, including the lights (not shown in FIG. 2), the sensors 110a-110z, and other devices that can be installed within the light bar. Light bar controller 120 can be further configured to receive, store, and or process sensor data outputted by sensors 110a-110z. In one embodiment, light bar controller 120 can be located within the housing of light bar 120. Alternatively, light bar controller 120 can be located outside of the housing of light bar 120.

The electric power needed for functioning of light bar 110 and light bar controller 120 can be supplied to light bar controller 120 by a power supply 140 via one or more wires 150. Power supply 140 can be provided, e.g., by the main battery of the motor vehicle. Alternatively, power supply 140 can be provided, e.g., by a power source independent from the main battery of the motor vehicle. In a yet another embodiment, the system can include two or more electric power supplies, e.g. each of the sensors can include an autonomous battery, while another battery can feed electric power to the processing unit. In a yet another embodiment, at least one of the sensors can be supplied with electricity by a battery disposed within the light bar housing, while other components of the sensor system can be electrically connected to the motor vehicle's main power supply. In a yet another embodiment, at least one of the sensors can be autonomously supplied with electricity by a battery disposed within the sensor housing, while other components of the sensor system can be electrically connected to the motor vehicle's main power supply or to a battery disposed within the light bar housing.

Light bar controller 120 can be communicatively coupled to a processing unit 160, e.g., via a wired interface 170. Processing unit 160 can be provided, e.g., by an onboard computer installed on the motor vehicle. A "computer" herein shall refer to a programmable device for data processing, including a central processing unit (CPU), a memory, and at least one communication interface. A computer can be provided, e.g., by a personal computer (PC) running Linux™ or Microsoft Windows™ operating system.

At least one of the data wires of wired interface 170 can be configured to carry sensor data. In an alternative embodiment, light bar controller 120 can be communicatively coupled to a processing unit 160 over a wireless communication interface.

The sensor data received by processing unit 160 can comprise sensor raw data items received from sensors 110a-110z by light bar controller 120 and re-transmitted to processing unit 160 without any intermediate processing by light bar controller 120. In some embodiments, the sensor data received by processing unit 160 can comprise data items derived by light bar controller 120 from the sensor raw data items received from sensors 110a-110z. The processing of the sensor raw data items by light bar controller 120 can include, e.g., aggregating a plurality of sensor-originated data items received within a pre-determined or dynamically adjustable time period into one or more data items, translating sensor-originated data items into one or more pre-defined data formats, etc.

Processing unit 160 can be configured to execute a plurality of software modules, including a sensor data processing software module (not shown in FIG. 2). The sensor data processing software module can be configured to detect, based on the sensor data received from light bar controller 120 over interface 170, moving and/or stationary physical objects within a configurable perimeter, including the position of the physical object (e.g., the direction and the distance to the moving object) and the speed of the moving object. The sensor data processing software module can be further configured, responsive to detecting a person approaching the motor vehicle, to transmit a user notification via one or more notification devices.

The functions described herein as being performed by the sensor data processing software module can in one embodiment be performed by two or more software modules executable by processing unit 160. Alternatively, at least some of the functions described herein as being performed by the sensor data processing software module can be performed by one or more software modules executable by light bar controller 120.

Figure 3:
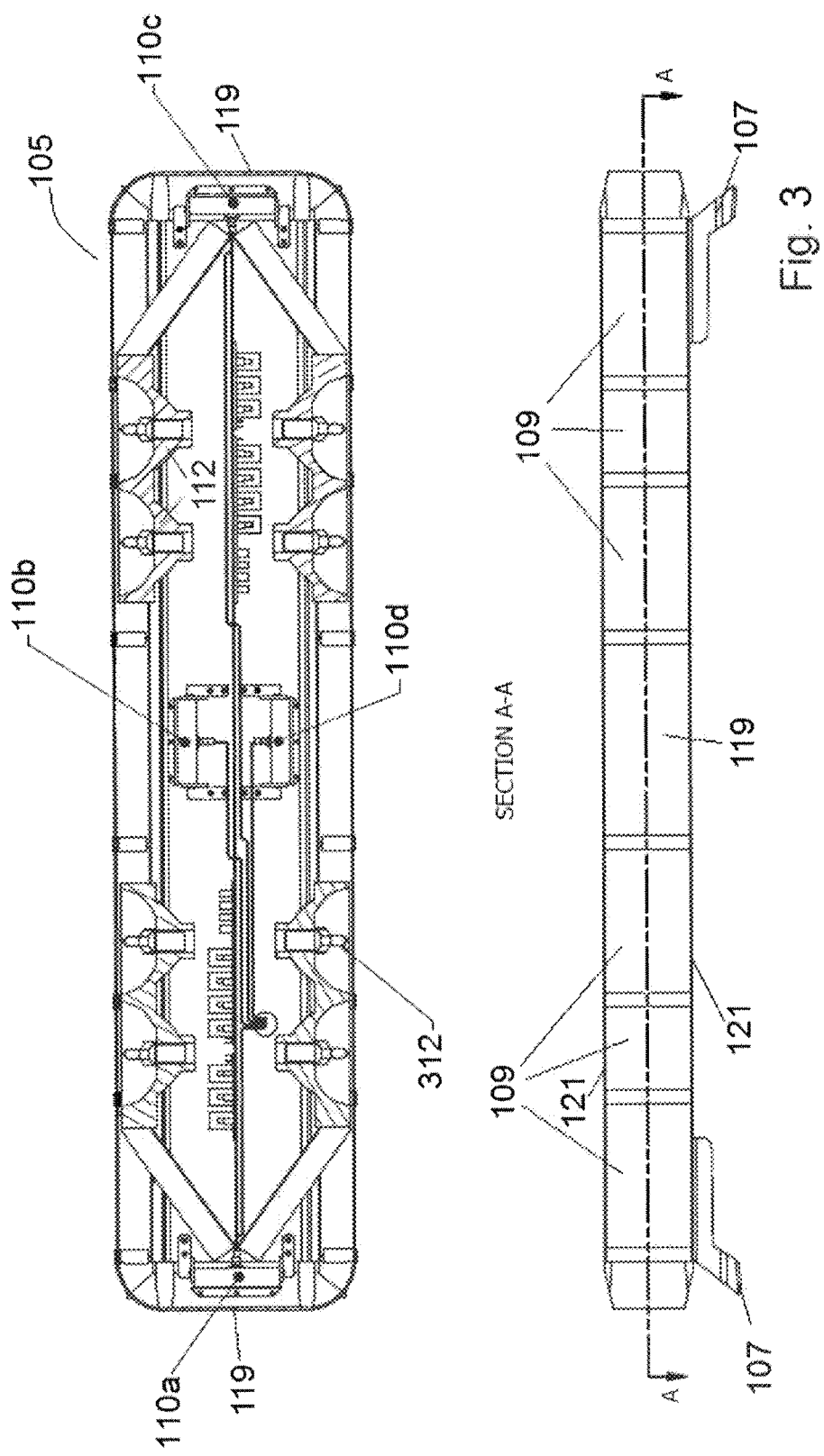
FIG. 3 schematically illustrates a cutaway view of one embodiment of a light bar disclosed herein.
Figure 4:
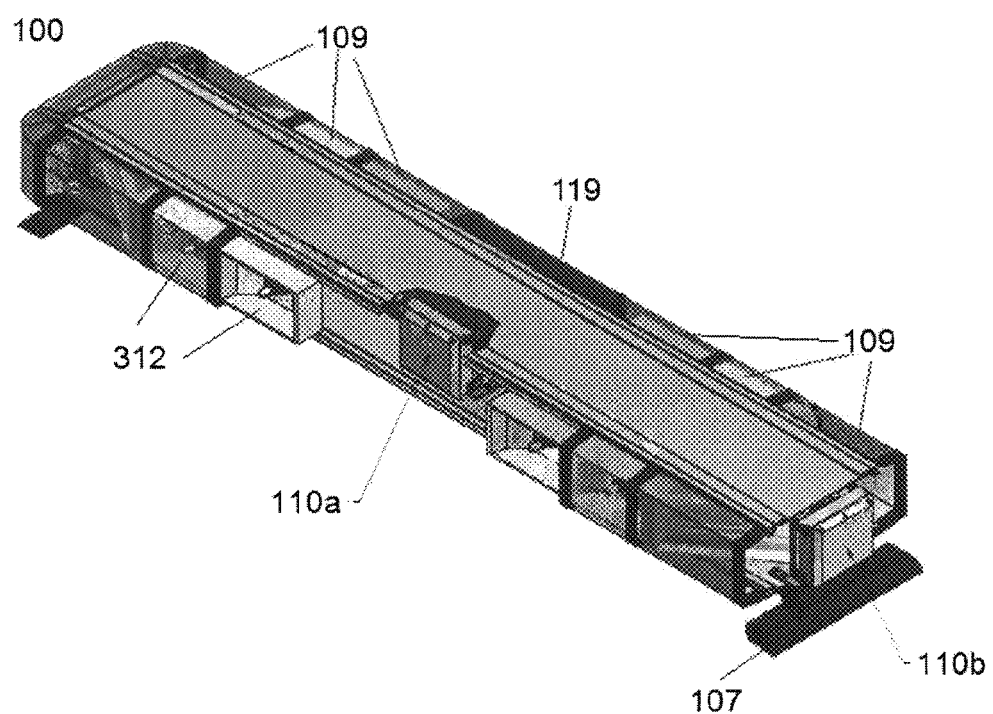
FIG. 4 schematically illustrates a sensor installation view of one embodiment of a light bar disclosed herein.
Figure 5:
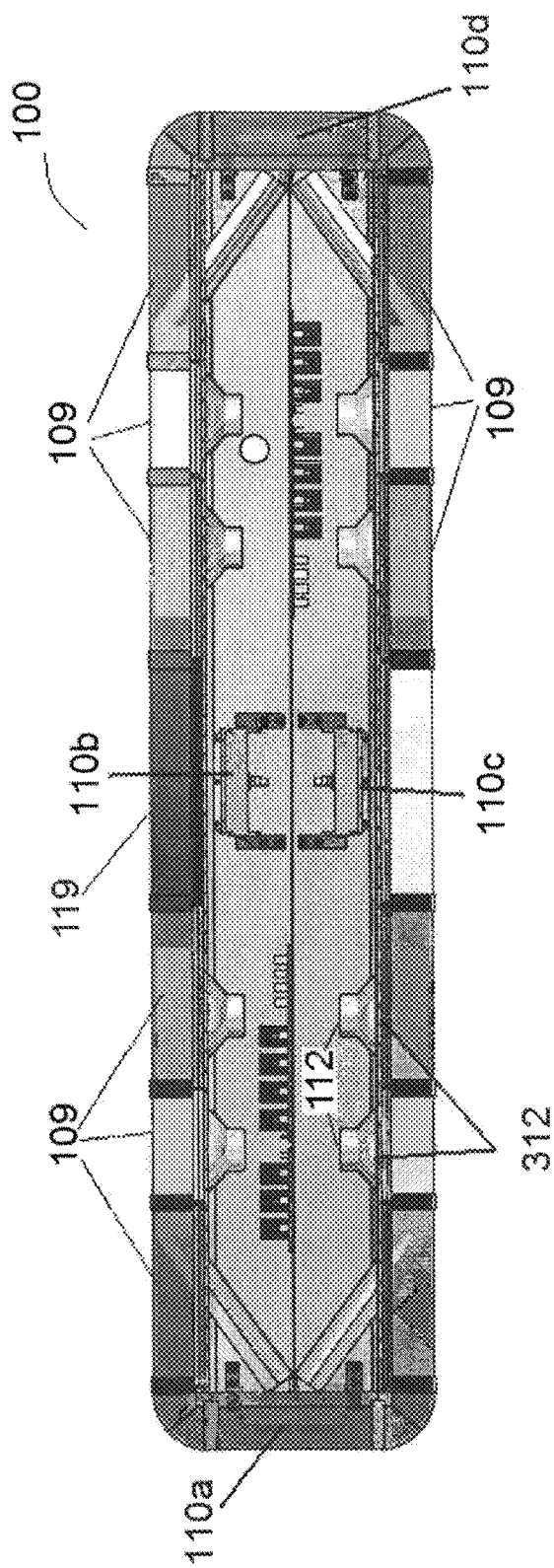
FIG. 5 schematically illustrates an open top view of one embodiment of a light bar disclosed herein.

An illustrative embodiment of light bar 100 is now being described with references to FIGS. 3-5. Light bar 100 can comprise an elongated housing 105 and mounting elements 107 configured to mount the light bar on the roof of a motor vehicle. Light bar housing 105 can comprise one or more light transmissive sections configured to transmit light in one or more pre-determined spectrum regions. The light transmissive sections can be manufactured, e.g., of a plastic, glass, or any other light transmissive material. Two or more light sources 312 configured to emit light of a high intensity can be installed within housing 105 behind light transmissive sections 109. Thus, the high intensity light emitted by light sources 312 can pass through light transmissive sections 109 and provide a visual notification to an observer located outside of the motor vehicle.

Also installed within light bar housing 105 can be a plurality of light reflectors 112 disposed behind light sources 312 and configured to reflect the light emitted by light sources 312.

In a further aspect, light bar housing 105 can comprise one or more light transmissive sections configured to transmit light in a first spectrum region, one or more light transmissive sections configured to transmit light in a second spectrum region, one or more light transmissive sections configured to transmit light in a third spectrum region, etc. For example, light bar housing 105 can comprise one or more light transmitting sections 109 transmitting light in the red spectrum region, one or more light transmitting sections 109 transmitting light in blue red spectrum region, and one or more light transmitting sections 109 transmitting light all spectrum regions (white light).

Each housing section can be mechanically coupled to two neighboring sections. In one embodiment, the coupling can employ gaskets, liners, rubber rings, and/or other sealing elements designed to make housing 105 resistant to adverse environmental factors (e.g., water).

Also installed within light bar housing 105 can be one or more sensors 110. In the illustrative embodiment of FIGS. 3-5, light bar housing can comprise four sensors 110a-110d facing the top, rear, left, and right directions relatively to the direction of travel of the motor vehicle. Sensors 110 and light sources 312 can be installed in an interleaved configuration.

In a further aspect, two or more light sources can comprise a first light source disposed behind a first light transmissive section and a second light source disposed behind a second light transmissive section.

In a further aspect, housing sections 119 behind which sensors 110 are installed, can be microwave energy transmissive. In some embodiments, housing sections 119 can be both microwave energy transmissive and light transmissive.

In a further aspect, light transmissive sections 109 and microwave energy transmissive sections 119 can be disposed substantially perpendicularly to the surface sustaining the motor vehicle. In the illustrative embodiment of FIGS. 3-5, light bar housing 105 can further comprise horizontal sections 121 disposed substantially parallel to the surface sustaining the motor vehicle. In a further aspect, light transmissive sections 109 and microwave energy transmissive sections 119 can be mechanically coupled to horizontal sections 121.

Figure 6:
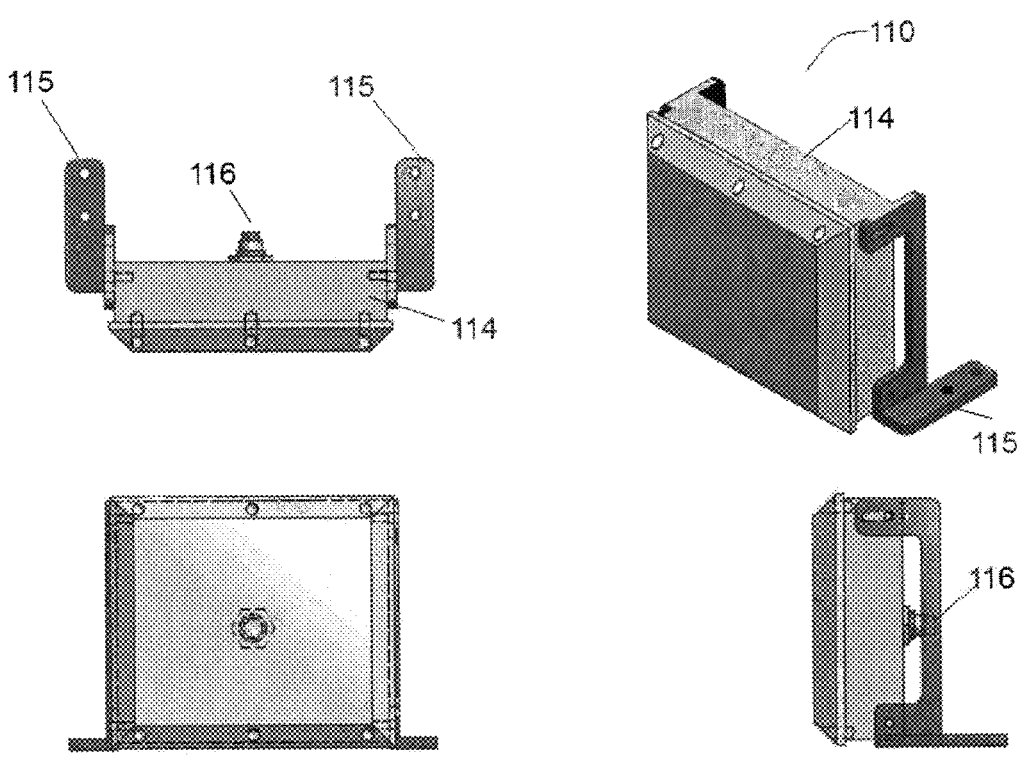
FIG. 6 schematically illustrates a sensor housing with mounting brackets and a multi-pin electromechanical connector.

In a further aspect, each sensor 110 can be disposed in a sensor housing 114, as shown in FIG. 6. Sensor housing 114 can comprise mounting brackets 115 configured to mount the sensor to the housing 105 or the internal frame of light bar 100. In one embodiment, a multi-pin electromechanical connector 116 can be disposed on the outer surface of sensor housing 114.

In one embodiment, sensors 110 can be provided by microwave radar sensors capable of detecting and tracking stationary and moving physical objects. In a further aspect, a microwave radar sensor can be capable to precisely measure the position and speed of a moving object. In another embodiment, other types of sensors can be employed, including infrared sensors configured to detect heat radiated by a moving object (e.g., by a human body), image sensors configured to convert an optical image into an electric signal, etc. In a yet another embodiment, sensors of several types can be employed, e.g., microwave radar sensors and image sensors.

Figure 7:
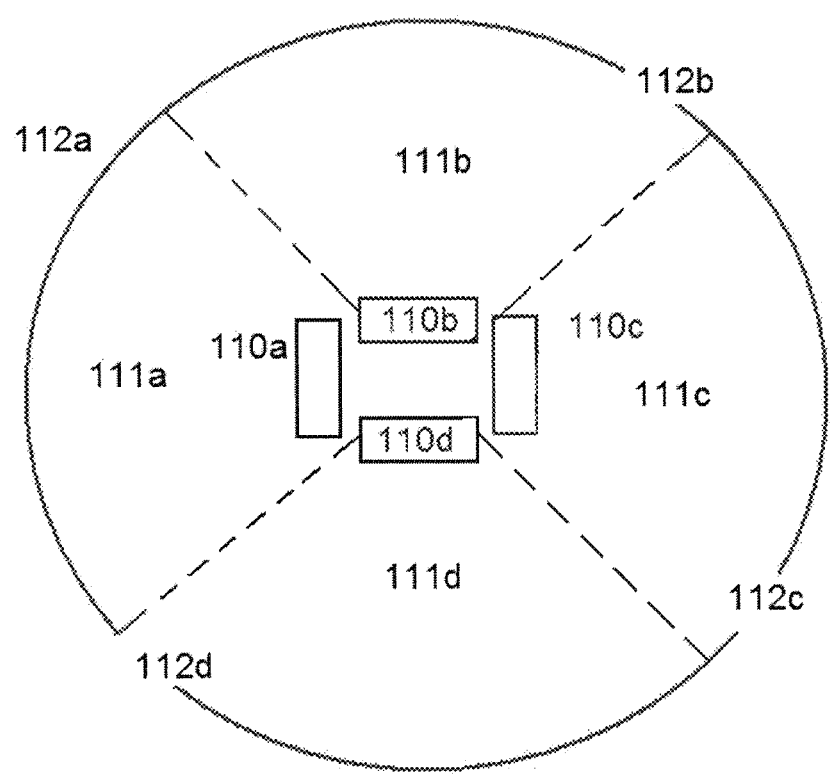
FIG. 7 schematically illustrates fields of view of several sensors comprised by the sensor system described herein.

In a further aspect, each sensor 110a-110d can be configured to sense stationary and/or moving physical objects within a spatial sector 111a-111d, as schematically shown in FIG. 7. The spatial sector within which a sensor can sense physical objects can also be referred to as the sensor's "field of view" (FOV), even though the sensor does not have to be an optical sensor. A projection of a sensor's FOV 111a onto the surface sustaining the motor vehicle carrying light bar 100 can be provided by a circle sector 112a. The combination of projections of all sensors' FOVs onto the surface sustaining the motor vehicle can compose a sensing perimeter.

In one embodiment, the sensors 110a-110d can be disposed within the light bar housing so the sensing perimeter comprises a full circle, with no "blind spots" (i.e., spatial sectors not covered by sensors) between individual sensors' FOVs to prevent a malicious party's approaching the motor vehicle without being detected by one of the sensors 110a-110d. Alternatively, the sensing perimeter can have an arbitrary shape configurable via a user interface.

In one embodiment, the sensor data processing software module can be configured to track a moving object successively traversing FOVs of one or more sensors 110a-110d. To correctly trace an object leaving a FOV of one sensor and entering a FOV of another sensor, the software module can be configured to convert a position of a detected object relative to a sensor to a universal coordinate system common for one or more sensors (e.g., a Cartesian coordinate system having the origin coinciding with the geometric center of projections of all sensor positions onto the surface sustaining the motor vehicle).

In some embodiment, the sensors 110a-110d can have overlaying FOVs in order to guarantee the absence of "blind spots" between the neighboring sensors' FOVs. In a further aspect, the sensor data processing software module can be configured to exclude duplicate event detection caused by overlaying FOVs of the sensors 110a-110z when a single moving or stationary physical object can be simultaneously detected by two sensors having overlaying FOVs. To exclude duplicate event detection, the software module can be configured to convert a position of a detected object relative to a sensor to a universal coordinate system common for all sensor (e.g., a Cartesian coordinate system having the origin coinciding with the geometric center of projections of all sensor positions onto the surface sustaining the motor vehicle).

In another aspect, the system can further comprise a notification device employed by the sensor data processing software module to transmit a user notification responsive to detecting a person approaching the motor vehicle. In one embodiment, the sensor data processing software module can be configured to display a visual alert on the screen of the motor vehicle onboard computer. In a further aspect, a visual alert can be provided by an In-Program alert displayed only within the window of the sensor data processing application itself, so the alert can only be visible when the application window is viewable on the screen. Alternatively, a visual alert can be provided by an On-Screen alert displayed on top of any open windows even if the sensor data processing application is minimized and not viewable.

In another embodiment, the notification device can be provided by a light-emitting diode (LED) which can be prominently located within the field of view of the motor vehicle's occupant (e.g., on the motor vehicle's dashboard). In one embodiment, the LED can be blinking to attract the motor vehicle occupant's attention. A skilled artisan would appreciate the fact that other embodiments of visual notification devices are within the scope of this disclosure.

In a yet another embodiment, the notification device can be provided by the motor vehicle's search light. In a further aspect, the search light can be configured, responsive to the sensor system detecting a person approaching the motor vehicle, to be switched on and/or automatically oriented generally in a direction of the approaching person, thus deterring the person from further approaching the vehicle.

In a yet another embodiment, the notification device can be provided by an audible notification device, e.g., a beeper configured to emit series of beeps. Alternatively, the audible notification can be provided by a sound output device employed by the onboard computer. Alternatively, the audible notification device can be integrated into the existing radio-speakers of the motor vehicle.

In one illustrative embodiment, audible notifications provided by the sensor system can be indicative of the direction to the detected object (e.g., voice notification of a direction to the detected object relatively to the direction of travel of the motor vehicle) and/or distance to the detected object (e.g., the notification volume can be reverse proportional to the distance to the detected object).

In a further aspect, the sensor data processing software application can be configured to override the current volume settings of the sound output device thus allowing audible notifications even if the sound output device has been set to a low volume or muted prior to the notification transmission.

In a yet another, the notification device can be provided by a remote notification device which can be communicatively coupled to the processing unit, e.g., via a wireless communication interface, for example, using the onboard computer wireless network connection. The remote notification device can be particularly useful in a situation when an appearance of a moving person in the vicinity of a motor vehicle can be considered as a threat to the motor vehicle's occupant. For example, the remote notification device can be used to automatically summon additional police units.

In a yet another embodiment, the notification device can be provided by a combination of one or more visual and one or more audible notification devices.

In a further aspect, the sensor data processing software module can be configured to activate the notification device based on any combination of the distance to the moving object, the speed of the moving object, the direction of the moving object, and the size of the moving object.

Filtering out objects based on their estimated speed can be particularly useful to substantially reduce the number of potential false alarms caused by fast moving objects, even if they are within the sensing perimeter, for example, fast moving cars, when the vehicle equipped with the sensor system described herein is parked on a curb.

Filtering out objects based on their direction of travel can be particularly useful to substantially reduce the number of potential false alarms caused by objects moving parallel to the vehicle equipped with the sensor system described herein, rather than towards the vehicle.

This can be advantageously used to substantially reduce the number of potential false alarms by reducing the area, an appearance of a moving human being in which shall be considered as a threat to the occupant of the motor vehicle. The threshold distance can be specified by the system user via the user interface described herein infra.

In one embodiment, the sensor system can be configured to store in a non-volatile memory at least some events detected by the processing unit. The non-volatile memory can be provided, e.g., by a flash memory. The types of the events to be logged in the non-volatile memory can be selected by a user via the user interface described herein infra. The logged event records can be retrieved from the non-volatile memory via the user interface described herein infra.

In one embodiment, the sensor system can be configured to notify a remote location of at least some events detected by the processing unit, e.g., via a wireless communication interface. In a further aspect, the system's user can specify the remote notification parameters, including the remote location network address and types of events for which notification is required, via the user interface described herein infra.

In one embodiment, the sensor system can include a user interface which can be configured to modify system parameters. In one embodiment, the user via the user interface can select a notification device to be used and/or notification device parameters (e.g., beeper volume). In another embodiment, the user via the user interface can configure the distance to the border of the area an appearance of a moving human being in which shall be considered as a threat to the occupant of the motor vehicle. In a yet another embodiment, the user can select the types of events and the logging format for event logging. In a further embodiment, the user can retrieve the logged event records from the sensor's system non-volatile memory. In a further embodiment, the user can select the parameters of remote location notification, including the types of events and the remote location network address.

In another aspect, the user interface can be provided by a graphical user interface (GUI) implemented by a touch-screen mounted within the motor vehicle, preferably in a location readily accessible from the driver's seat. In another embodiment, the user interface can be provided by a notebook computer connecting to the sensor system's processing unit via a wired or wireless communications interface. In a further aspect, the sensor's system processing unit can act as an HTTP server and expose a graphical user interface as an HTML page which can be viewed by an HTTP client connecting to the sensor's system's processing unit via a wired or wireless communications interface. An example of a graphical user interface for the sensor system according to the invention is shown in FIG. 8.

Figure 8:
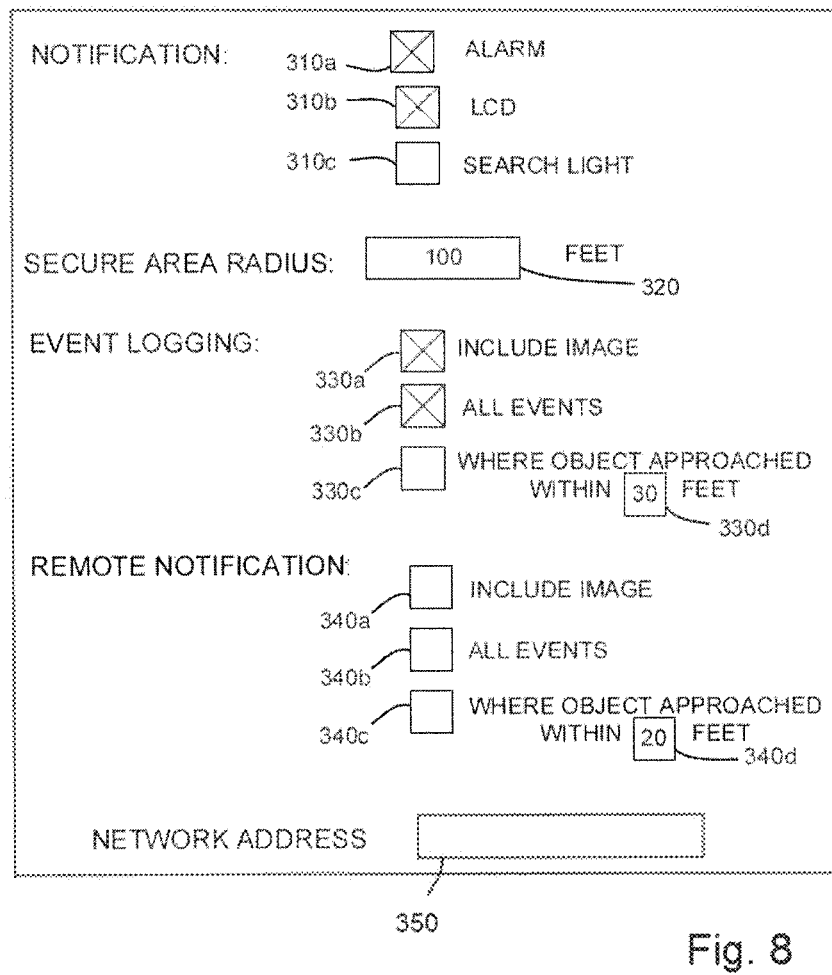
FIG. 8 schematically illustrates an example of a graphical user interface for the sensor system disclosed herein.

In one embodiment, shown in FIG. 8, the graphical user interface can comprise notification method selection check-boxes 310a-310c. The graphical user interface can further comprise a secure area radius selection text box 320. The graphical user interface can further comprise event logging check-boxes 330a-330d. The graphical user interface can further comprise remote notification parameters check-boxes 340a-340d. The graphical user interface can further comprise a remote network address text box 350. A skilled artisan would appreciate the fact that other methods if implementing the graphical user interface are within the scope of this disclosure.

In a yet another embodiment, the user interface can be provided by keypad mounted within the motor vehicle, preferably in a location readily accessible from the driver's seat. In a further aspect, the keypad can comprise one or more key configured to select values of one or more parameter of the sensor system. In a further aspect, the keypad can further comprise one or LED and/or LCD indicators configured to represent the currently selected value of one or more parameter of the sensor system. An example of a keypad-based user interface for the sensor system according to the invention is shown in FIG. 9.

Figure 9:
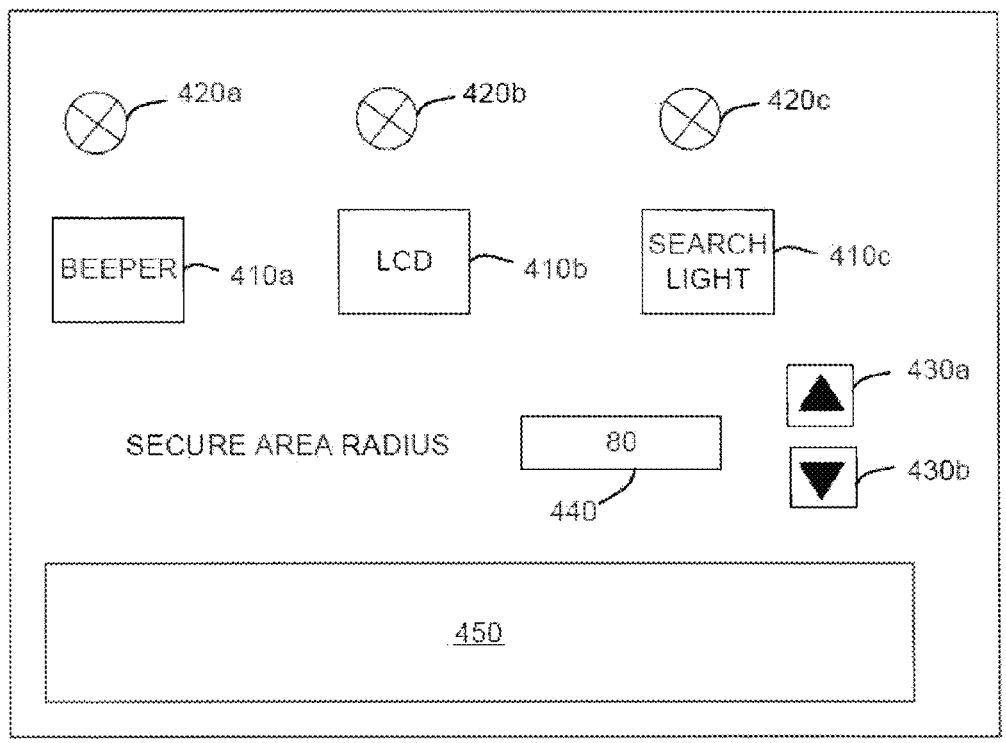
FIG. 9 schematically illustrates an example of a keypad-based user interface for the sensor system disclosed herein.

In one embodiment, shown in FIG. 9, the keypad-based user interface can comprise notification method selection keys 410a-410c and notification method LED indicators 420a-420c. The keypad-based user interface can further comprise two secure area radius selection buttons 430a-430b and a secure area radius LCD indicator 440. The keypad-based user interface can further comprise an LCD screen 450. A skilled artisan would appreciate the fact that other methods if implementing the keypad-based user interface are within the scope of this disclosure.

While the present invention would be particularly useful for installing on police, military, security or other type of vehicles including a roof-mounted light bar, using the invention for other types of motor vehicles with or without a roof-mounted light bar is within the scope of this disclosure.

While the present invention has been particularly shown and described with reference to certain exemplary embodiments, it will be understood by one skilled in the art that various changes in detail may be affected therein without departing from the scope of this disclosure as defined by claims that can be supported by the written description and drawings. Further, where exemplary embodiments are described with reference to a certain number of elements it will be understood that the exemplary embodiments can be practiced utilizing less than the certain number of elements.

In one embodiment, there is provided a light bar assembly comprising an elongated housing mountable to a roof of a motor vehicle and comprising a plurality of light transmissive sections. The light bar assembly can further comprise two or more light sources disposed within the elongated housing and one or more sensors disposed in an interleaved configuration with the light sources. The light bar assembly can further comprise a controller communicatively coupled to the light bar via a wired interface including data wires and electric power wires. The data wires can be communicatively coupled to the sensors. Each sensor can be configured to output an electrical signal responsive to detecting a physical object within a spatial sector. A projection on a surface sustaining the motor vehicle of each spatial sector can be provided by a circle sector. The combination of all circle sectors can compose a sensing perimeter. In one embodiment, the sensing perimeter can be provided by a full circle with a center disposed within a projection of the motor vehicle onto the surface. Alternatively, the sensing perimeter can have an arbitrary shape configurable via a user interface.

A small sample of systems, methods and apparatuses that are described herein is as follows:

A1. A light bar assembly comprising:

an elongated housing mountable to a roof of a motor vehicle, said elongated housing comprising a plurality of light transmissive sections;

two or more light sources disposed within said elongated housing;

one or more sensors disposed in an interleaved configuration with said two or more light sources;

a controller communicatively coupled to said light bar via a wired interface, said wired interface comprising one or more data wires and one or more electric power wires;

wherein at least one data wire of said wired interface is communicatively coupled to at least one sensor of said one or more sensors ;

wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a full circle with a center disposed within a projection of said motor vehicle onto said surface.

A2. The light bar assembly of (A1), wherein said plurality of light transmissive sections comprises a first light transmissive section and a second light transmissive section;

wherein a first light source of said two or more light sources is disposed behind said first light transmissive section; and wherein a second light source of said two or more light sources is disposed behind said first light transmissive section.

A3. The light bar assembly of (A1), wherein at least one sensor of said one or more sensors is provided by a microwave radar sensor.

A4. The light bar assembly of (A1), wherein said one or more sensors are provided by four sensors oriented towards front, rear, left, and right directions relative to a direction of travel of said motor vehicle.

A5. The light bar assembly of (A1), further comprising a second wired interface including one or more one electric power wires and one or more data wires;

wherein said one or more electric power wires of said second wired interface are configured to electrically couple said controller to an electric power supply; and wherein said one or more data wires of said second wired interface are configured to communicatively couple said controller to a processing unit.

A6. The light bar assembly of (A1), wherein each section of said housing is mechanically coupled to at least two neighboring sections.

A7. The light bar assembly of (A1), wherein each light transmissive section of said plurality of light transmissive sections is configured to transmit light in a pre-determined spectrum region.

A8. The light bar assembly of (A1), further comprising a plurality of light reflectors installed behind said light sources within said housing, said light reflectors configured to reflect light emitted by said light sources.

A9. The light bar assembly of (A1), wherein each sensor of said one or more sensors is disposed in a sensor housing comprising a multi-pin electromechanical connector.

A10. The light bar assembly of (A1), wherein said light transmissive sections are disposed substantially perpendicularly to said surface sustaining said motor vehicle.

A11. The light bar assembly of (A1), wherein said housing further comprises two horizontal sections disposed substantially parallel to said surface sustaining said motor vehicle; and wherein said light transmissive sections are mechanically coupled to said two horizontal sections.

B1. A light bar assembly comprising:

an elongated housing mountable to a roof of a motor vehicle, said elongated housing comprising a plurality of light transmissive sections;

two or more light sources disposed internally within said elongated housing;

one or more sensors disposed in an interleaved configuration with said two or more light sources;

a controller communicatively coupled to said light bar via a wired interface, said wired interface comprising one or more data wires and one or more electric power wires;

a user interface in communication with said controller;

wherein at least one data wire of said wired interface is communicatively coupled to at least one sensor of said one or more sensors ;

wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a configurable arbitrary shape.

B2. The light bar assembly of (B1), wherein at least one sensor of said one or more sensors is provided by a microwave radar sensor.

B3. The light bar assembly of (B1), wherein said one or more sensors are provided by four sensors oriented towards front, rear, left, and right directions relative to a direction of travel of said motor vehicle.

B4. The light bar assembly of (B1), further comprising a second wired interface including one or more one electric power wires and one or more data wires;

wherein said one or more electric power wires of said second wired interface are configured to electrically couple said controller to an electric power supply; and wherein said one or more data wires of said second wired interface are configured to communicatively couple said controller to a processing unit.

B5. The light bar assembly of (B1), wherein each section of said housing is mechanically coupled to at least two neighboring sections.

B6. The light bar assembly of (B1), wherein each light transmissive section of said plurality of light transmissive sections is configured to transmit light in a pre-determined spectrum region.

B7. The light bar assembly of (B1), further comprising a plurality of light reflectors installed behind said light sources within said housing, said light reflectors configured to reflect light emitted by said light sources.

B8. The light bar assembly of (B1), wherein each sensor of said one or more sensors is disposed in a sensor housing comprising a multi-pin electromechanical connector.

B9. The light bar assembly of (B1), wherein said light transmissive sections are disposed substantially perpendicularly to said surface sustaining said motor vehicle.

B10. The light bar assembly of (B1), wherein said housing further comprises two horizontal sections disposed substantially parallel to said surface sustaining said motor vehicle; and wherein said light transmissive sections are mechanically coupled to said two horizontal sections.

C1. A system for detecting physical objects within a configurable perimeter, said system comprising:

a light bar mountable on a roof of a motor vehicle, said light bar including two or more light sources and one or more sensors disposed within a housing of said light bar;

a controller communicatively coupled to said light bar via a first wired interface, said first wired interface comprising one or more data wires and one or more power wires;

an electric power supply electrically coupled to said controller via at least one wire;

a processing unit communicatively coupled to said controller via a second wired interface, said second wired interface comprising one or more data wires;

a software module executable by said processing unit, said software module configured to detect a physical object moving within said configurable perimeter; and a notification device communicatively coupled to said processing unit;

wherein at least one data wire of said first wired interface is configured to carry one or more sensor data items received from at least one sensor of said one or more sensors;

wherein at least one data wire of said second wired interface is configured to carry data received from said controller, said data comprising one of: said one or more sensor data items, one or more data items derived from said one or more sensor data items;

wherein said software module is configured, responsive to detecting, based on said data received from said controller, a person approaching said motor vehicle, to transmit a notification via said notification device.

C2. The system of (C1), wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a full circle with a center disposed within a projection of said motor vehicle onto said surface.

C3. The system of (C1), wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a configurable arbitrary shape.

C4. The system of (C1), wherein at least one sensor of said one or more sensors is provided by a microwave radar sensor.

C5. The system of (C1), wherein said light sources and said sensors are mounted within said housing in an interleaving order.

C6. The system of (C1), wherein said one or more sensors are provided by four sensors oriented towards front, rear, left, and right directions relative to a direction of travel of said motor vehicle.

C7. The system of (C1), wherein said processing unit is provided by a personal computer installed on said motor vehicle.

C8. The system of (C1), wherein said notification device is provided by a screen of a personal computer installed on said motor vehicle.

C9. The system of (C1), wherein said notification device is provided by a sound output device of a personal computer installed on said motor vehicle.

C10. The system of (C1), wherein said notification device is provided by a search light configured to be switched on and oriented generally in a direction of a person approaching said motor vehicle.

C11. The system of (C1), wherein said electric power supply is provided by a main battery of said motor vehicle.

C12. The system of (C1), wherein said electric power supply is independent from an electric power supply of said motor vehicle.

C13. The system of (C1), further comprising a user interface configured to modify at least one parameter of said system.

C14. The system of (C1), wherein said processing unit is configured to activate said notification device based on at least one of: a distance to a moving object, a speed of a moving object, a direction of a moving object, and a size of a moving object.

C15. The system of (C1), further configured to store in a non-volatile memory one of: said one or more data items, at least one data item derived from said one or more data items.

C16. The system of (C1), further configured to transmit to an external computer one of: said one or more data items, at least one data item derived from said one or more data items.

D1. A system for detecting physical objects within a configurable perimeter, said system comprising:

a light bar mountable on a roof of a motor vehicle, said light bar including two or more light sources and one or more sensors disposed within a housing of said light bar;

a processing unit communicatively coupled to said one or more sensors via one of: a wired interface comprising one or more data wires, a wireless interface;

a software module executable by said processing unit, said software module configured to detect a physical object moving within said configurable perimeter; and a notification device communicatively coupled to said processing unit;

wherein said software module is configured, responsive to receiving from at least one sensor of said one or more sensors one or more sensor data items comprising coordinates of a physical object, to convert said coordinates into a universal coordinate system common for one or more sensors of said one or more sensors; and wherein said software module is further configured, responsive to detecting, based on said one or more sensor data items, a person approaching said motor vehicle, to transmit a notification via said notification device.

D2. The system of (D1), wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a full circle with a center disposed within a projection of said motor vehicle onto said surface.

D3. The system of (D2), wherein each sensor of said one or more sensors is configured to output an electrical signal responsive to detecting a physical object within a spatial sector, a projection on a surface sustaining said motor vehicle of said spatial sector being a circle sector, a combination of all circle sectors composing a sensing perimeter; and wherein said sensing perimeter is provided by a configurable arbitrary shape.

D3. The system of (D1), wherein at least one sensor of said one or more sensors is provided by a microwave radar sensor.

D4. The system of (D1), wherein said one or more sensors are provided by four sensors oriented towards front, rear, left, and right directions relative to a direction of travel of said motor vehicle.

D5. The system of (D1), wherein said universal coordinate system has an origin disposed within a geometric center of projections of positions of one or more sensors of said one or more sensors.

D6. The system of (D1), wherein said software module is further configured to exclude duplicate event detection caused by overlaying of fields of view of one or more sensors of said one or more sensors.

The invention claimed is:

1. An assembly comprising: one or more sensors configured to be supported by a motor vehicle; a processing system including a controller, the controller communicatively coupled to said one or more sensors; a user interface in communication with said controller; wherein each sensor of said one or more sensors is configured to output an electrical signal responsive to detecting a physical object within a spatial sector projected on a surface sustaining said motor vehicle, a combination of spatial sectors composing a sensing perimeter; and wherein said sensing perimeter is provided by a configurable shape, wherein the user interface allows a user to configure the configurable shape, wherein said processing system is configured, responsive to detecting, based on data items of the one or more sensors, a person approaching said motor vehicle, to transmit a notification so that a notification performed using a notification device light source includes light from the notification device light source being switched on and being automatically oriented generally in a direction of the approaching person.

2. The assembly of claim 1, wherein the configurable shape is an arbitrary shape.

3. The assembly of claim 1, wherein the configurable shape is a closed perimeter shape.

4. The assembly of claim 1, wherein the user interface allows a user to specify a distance from the motor vehicle at which the physical object is detected.

5. The assembly of claim 1, wherein the user interface is an electronically displayed user interface.

6. The assembly of claim 1, wherein the assembly is adapted to filter out a moving physical object based on a speed of travel of the moving physical object, so that a moving car moving within the sensing perimeter, when filtered out, is not detected as a person approaching motor vehicle.

7. A system for detecting physical objects within a perimeter, said system comprising: one or more sensors configured to be supported by a motor vehicle; a processing system; said processing system configured to detect a physical object moving within said perimeter based on an output of said one or more sensors; and a notification device communicatively coupled to said processing system, said notification device being operative to emit light; wherein said processing system is configured, responsive to detecting, based on data items of the one or more sensors and with the motor vehicle parked, a person approaching said motor vehicle, to transmit a notification via said notification device so that a notification performed using the notification device light source when the motor vehicle is parked includes the notification device emitting light to indicate a direction from which the approaching person is approaching said motor vehicle.

8. The system of claim 7, wherein said processing system is configured to activate said notification device based on at least one of: a speed of a moving object, a direction of a moving object, and a size of a moving object.

9. The system of claim 7, further configured to store in a non-volatile memory one of: said one or more data items, at least one data item derived from said one or more data items.

10. The system of claim 7, wherein said processing system is configured, responsive to detecting, based on data items of the one or more sensor, a person approaching said motor vehicle, to transmit a notification via said notification device so that a notification performed using the notification device includes a notification device light source of the notification device being switched on.

11. The system of claim 7, wherein said processing system is configured, responsive to detecting, based on data items of the one or more sensor, a person approaching said motor vehicle, to transmit a notification via said notification device so that a notification performed using the notification device includes light from a notification device light source of the notification device being automatically oriented generally in a direction of the approaching person.

12. The system of claim 7, wherein the system includes a second notification device communicatively coupled to said processing system, said second notification device configured to provide a visual indicator to an occupant of the motor vehicle; wherein said processing system is configured, responsive to detecting, based on data items of the one or more sensor, a person approaching said motor vehicle, to transmit a notification via said second notification device so that a notification performed using the second notification device when the motor vehicle is parked includes the second notification device providing a visual indication to attract the attention of the occupant of the motor vehicle.

13. The system of claim 7, wherein the system includes a second notification device communicatively coupled to said processing system, said second notification device including a display screen of an onboard computer of the motor vehicle; wherein said processing system is configured, responsive to detecting, based on data items of the one or more sensor, a person approaching said motor vehicle, to transmit a notification via said second notification device so that a notification performed using the second notification device when the motor vehicle is parked includes the display screen providing an alert.

14. The system of claim 7, wherein said processing system is configured to activate said notification device based on at least one of: a distance to a moving object, a speed of a moving object, a direction of a moving object, and a size of a moving object.

15. The system of claim 7, wherein said processing system is configured to activate said notification device based on a speed of a moving object.

16. The system of claim 7, wherein said processing system is configured to activate said notification device based on a direction of a moving object.

17. The system of claim 7, wherein said processing system is configured to activate said notification device based on a size of a moving object.

18. A system comprising: one or more sensors configured to be supported by a motor vehicle; a processing system communicatively coupled to said one or more sensors; said processing system configured to detect a physical object moving within a perimeter; and a notification device communicatively coupled to said processing system; wherein said processing system is further configured, responsive to detecting, based on one or more sensor data items of said one or more sensors, a person approaching said motor vehicle, to transmit a notification via said notification device, and wherein the notification device is in communication with the processing system via a wireless communication interface, wherein the system includes a user interface for configuring the system, wherein the user interface is in communication with the processing system via a wireless communication interface, wherein the system includes a second notification device, wherein, each of the notification device and the second notification device can be activated or deactivated with use of the user interface, wherein the user interface allows a user to input an identifier of a device for performing the notification, wherein the user interface allows a user to designate types of events sensed by said system that are logged into a non-volatile memory of said system, wherein said perimeter is of a configurable shape and wherein the user interface allows a user to configure the configurable shape, wherein the user interface allows a user to specify a threshold distance at which said person approaching said motor vehicle is detected, and wherein the system is adapted to filter out a detecting of a person moving toward the motor vehicle based on direction of travel of a moving physical object.

19. The system of claim 18, wherein the notification device is capable of being external to the motor vehicle and wherein the notification device is in communication with the processing system via a wireless communication interface.

20. The system of claim 7, wherein the system includes a user interface device for configuring the system, wherein the user interface device is in communication with the processing system via a wireless communication interface.

21. The system of claim 7, wherein the system includes a user interface and wherein the notification device can be activated or deactivated with use of the user interface.

22. The system of claim 18, wherein the system includes a user interface that allows a user to input an identifier of a device for performing the notification by specifying a network address of a device for performing the notification.

23. The system of claim 7, wherein the system includes a user interface that allows a user to designate types of events sensed by said system that are logged into a non-volatile memory of said system.

24. The system of claim 7, wherein the perimeter is of a configurable shape and the system includes a user interface that allows a user to configure the configurable shape.

25. The system of claim 18, wherein the system includes a feature selected from the group consisting of (a) the perimeter is of a configurable shape and the system includes an electronically displayed user interface that allows a user to configure the configurable shape, and (b) the system includes an electronically displayed user interface that allows a user to specify a threshold distance at which said person approaching said motor vehicle is detected.

26. A system for detecting physical objects within a perimeter, said system comprising: one or more sensors; a light bar mountable on a roof of a motor vehicle, said light bar including two or more light sources and said one or more sensors disposed within a housing of said light bar; a processing system; said processing system configured to detect a physical object moving within said perimeter; and a notification device communicatively coupled to said processing system, said notification device including a notification device light source configured to direct light externally from said motor vehicle; wherein said processing system, when said motor vehicle is parked, is configured, responsive to detecting, based on data items of the one or more sensors, a person approaching said motor vehicle, to transmit a notification via said notification device so that a notification performed using the notification device light source includes the notification device light source being switched on and the notification device light source being automatically oriented generally in a direction of the person approaching said motor vehicle.

27. The system of claim 26, wherein the notification performed using the notification device light source includes the notification device light source being switched on and the notification device light source being automatically oriented generally in a direction of the person approaching said motor vehicle.

28. The system of claim 26, wherein the system includes a user interface, and wherein the perimeter is of a configurable shape configurable using the user interface.

29. The system of claim 26, wherein the notification device is provided by a search light of a motor vehicle.

30. The system of claim 26, wherein said processing system is adapted to filter out a moving physical object based on or more of a speed or direction of the moving physical object determined using data of the one or more sensor so that the moving physical object moving within the perimeter, when filtered out, is not detected as a person approaching the motor vehicle.

31. A system comprising: one or more sensors configured to be supported by a motor vehicle; a processing system communicatively coupled to said one or more sensors; said processing system, when said motor vehicle is parked, configured to detect a physical object moving within a perimeter; and a notification device communicatively coupled to said processing system; wherein said processing system, when said motor vehicle is parked, is further configured, responsive to detecting, based on one or more sensor data items of said one or more sensors, a person approaching said motor vehicle, to transmit a notification via said notification device, and, wherein said processing system is adapted to filter out a moving physical object based on a direction of travel of the moving physical object, so that the moving physical object, when filtered out, is not detected as a person approaching motor vehicle, wherein said processing system is configured, responsive to detecting, based on data items of the one or more sensors, a person approaching said motor vehicle, to transmit a notification via said notification device so that a notification performed using a notification device light source of the notification device when the motor vehicle is parked includes the notification device light source being switched on, and being automatically oriented generally in a direction of the approaching person.

32. The system of claim 31, wherein the processing system is adapted so that if the moving physical object is moving in parallel to the motor vehicle the moving physical object is filtered out and not detected as a person approaching the motor vehicle.

* * * * *

UNITED STATES PATENT AND TRADEMARK OFFICE
CERTIFICATE OF CORRECTION

Page 1 of 1

PATENT NO. : 9,738,253 B2
APPLICATION NO. : 13/472083
DATED : August 22, 2017
INVENTOR(S) : Czyz et al.

It is certified that error appears in the above-identified patent and that said Letters Patent is hereby corrected as shown below:

In the Claims

Column 16, Line 37: Claim 7, Delete "light source when the motor vehicle is parked includes the" and insert --includes the--

Signed and Sealed this
Eighth Day of May, 2018

Andrei Iancu
*Director of the United States Patent and Trademark Office*